United States Patent [19]
Peek et al.

[11] Patent Number: 5,807,018
[45] Date of Patent: Sep. 15, 1998

[54] SIDEWINDER CLIP

[75] Inventors: Brian R. Peek, Mokena; Charles Meyer, New Lenox, both of Ill.

[73] Assignee: Illinois Tool Works Inc., Glenview, Ill.

[21] Appl. No.: 705,338

[22] Filed: Aug. 29, 1996

[51] Int. Cl.$^6$ ..................................................... F16B 2/22
[52] U.S. Cl. ........................ 403/397; 403/391; 403/399; 24/455; 24/297; 248/74.2; 248/316.7
[58] Field of Search .................................... 403/397, 398, 403/399, 405.1, 406.1, 364, 391; 24/455, 570, 297; 248/74.2, 68.1, 462, 74.1, 74.3, 46, 316.7; 256/48, 47, 53, 50

[56] References Cited

U.S. PATENT DOCUMENTS

| | | | |
|---|---|---|---|
| 4,023,758 | 5/1977 | Yuda | 248/74.3 X |
| 4,691,883 | 9/1987 | Kurihara | 248/74.2 |
| 4,997,147 | 3/1991 | Velke, Sr. et al. | 248/68.1 X |
| 5,058,838 | 10/1991 | Velke, Sr. et al. | 248/68.1 X |

FOREIGN PATENT DOCUMENTS

| | | | |
|---|---|---|---|
| 2195700 | 4/1988 | United Kingdom | 24/455 |

*Primary Examiner*—Harry C. Kim
*Attorney, Agent, or Firm*—Kane, Dalsimer, Sullivan, Kurucz, Levy, Eisele and Richard, LLP

[57] ABSTRACT

A routing clip for fixing a conduit to a support is integrally molded from a plastic material and includes a U-shaped channel having two substantially parallel walls extending therefrom. Each of the walls has an inwardly curving projection, perhaps reaching or extending beyond the centerline of the U-shaped channel. The inwardly curving projections prevent a tube or conduit, secured within the U-shaped channel, from being readily removed therefrom.

9 Claims, 8 Drawing Sheets

SIDEWINDER CLIP

BACKGROUND OF THE INVENTION

1. Field of the Invention

The present invention is directed to a routing clip, and more particularly to such a clip for securing conduits such as piping, tubes, sheaths and cables of various kinds to fixed members, such as apertured partitions or walls, and provided with means for positively holding and maintaining the conduits or the like against substantially any movement with respect thereto. More particularly still, the present invention is a clip of this type molded integrally from a plastic material and including a pair of opposing projections, rather than a hinge mechanism, for holding a conduit or the like therein.

2. Description of the Prior Art

Motor vehicles have numerous conduits whose function is to supply various parts of the vehicle with pressurized fluid, or mechanical or electrical energy. For safety reasons, it is desirable for such tubing or cables to be fixed substantially immobile to vehicle walls or surfaces by means of some suitable support or clamp. Such a support or clamp must not only hold the tubing or cable substantially immobile, but must further be positively secured to the wall or other surface so as to avoid the inadvertent removal thereof due to vibration or other forces encountered when the vehicle is in operation. Prior art supports in the form of securing collars for receiving such tubing or cables by merely clipping thereon have not consistently met these requirements.

Hinged clips have been developed and enable such tubing or cables to be more positively held within the clip. Unfortunately, hinged clips can be closed inadvertently before tubing or cables are placed therein, and, in such cases, must be removed and replaced by another of the same type. Further, the hinge members themselves, being of thin material to permit flexing, often break prematurely, allowing the tubing or cables to shake loose from the clip.

The present invention is a routing clip which includes means, other than a hinged mechanism, for holding tubing or a cable therein.

SUMMARY OF THE INVENTION

Accordingly, the present invention is a routing clip for fixing a conduit, such as a tube, to a support, such as an apertured partition or wall. The routing clip is integrally molded from a plastic material and comprises a U-shaped channel into which the conduit is to be disposed.

Two substantially parallel walls extend from the U-shaped channel. Either at the opposite ends of the walls, or atop the walls, are inwardly curving projections. The projections curve inwardly toward the centerline of the U-shaped channel at opposite ends thereof. The projections may or may not cross the centerline.

The present invention will now be described in more complete detail, with frequent reference being made to the following set of drawing figures.

DETAILED DESCRIPTION OF THE PREFERRED EMBODIMENTS

Figure 1:
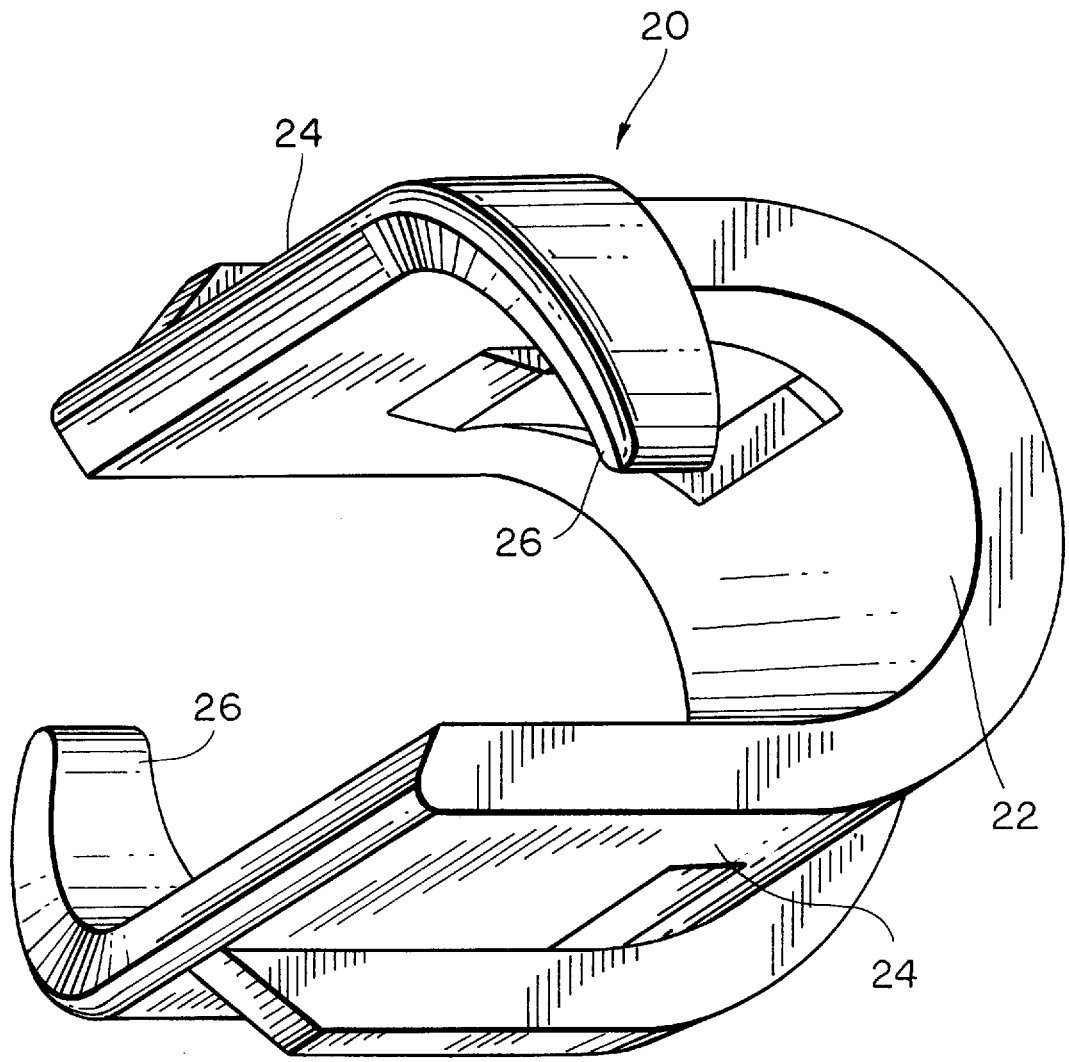
FIG. 1 is a perspective view of a first embodiment of the routing clip of the present invention.

FIG. 1 is a perspective view of a routing clip 20 in accordance with a first embodiment of the present invention. The routing clip 20 is integrally molded from a plastic material, such as nylon 6,6 and comprises a U-shaped channel 22 having two substantially parallel upstanding walls 24. At opposite ends of each of the two walls 24 are inwardly curving projections 26.

Figure 2:
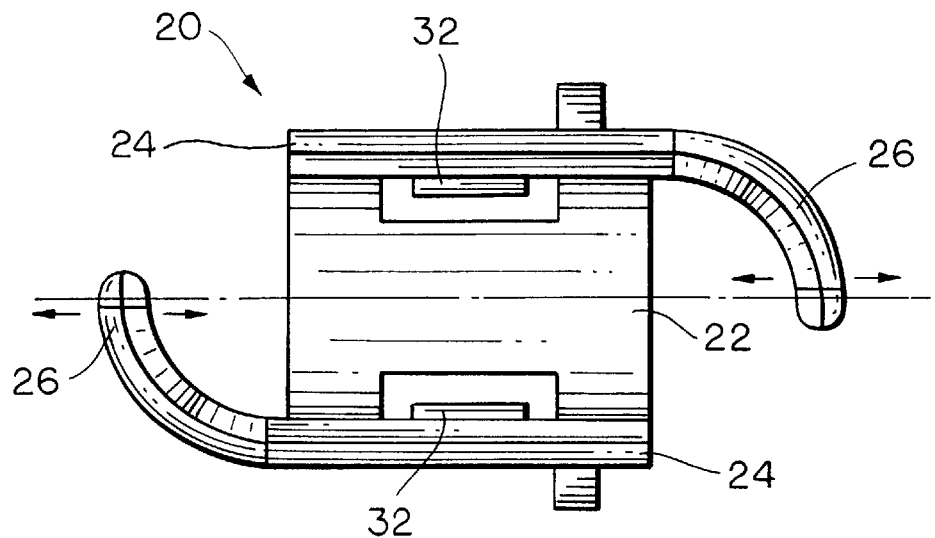
FIG. 2 is a top view of the routing clip shown in FIG. 1.

FIG. 2 is a top view of the routing clip 20 shown in FIG. 1. Inwardly curving projections 26 extend beyond the centerline of the routing clip 20 represented by the dashed line in the figure.

Figure 3:
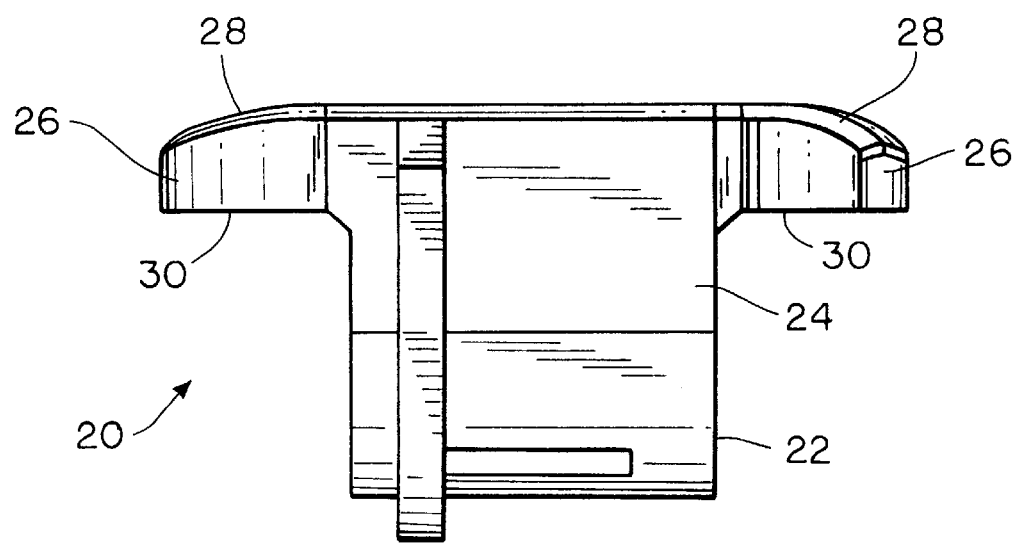
FIG. 3 is a side view of the routing clip shown in FIG. 1.

FIG. 3 is a side view of the routing clip 20 shown in FIG. 1. The inwardly curving projections 26 are thicker in a height direction, as apparent in FIG. 3, than in a width direction, as apparent in FIG. 2. Because of this difference, inwardly curving projections 26 will readily flex in a radial direction, as indicated by the arrows in FIG. 2, but will not readily flex in the vertical direction shown in FIG. 3. As a consequence, inwardly curving projections 26 will flex radially where a tube or the like is inserted into the U-shaped channel 22. The angling of the top surface 28 of the inwardly curving projections 26 facilitates this deflection. By way of contrast, the lower surfaces 30 of the inwardly curving projections 26 are flat, so that they will not readily flex radially outward against a force removing a tube from U-shaped channel 22.

Figure 4:
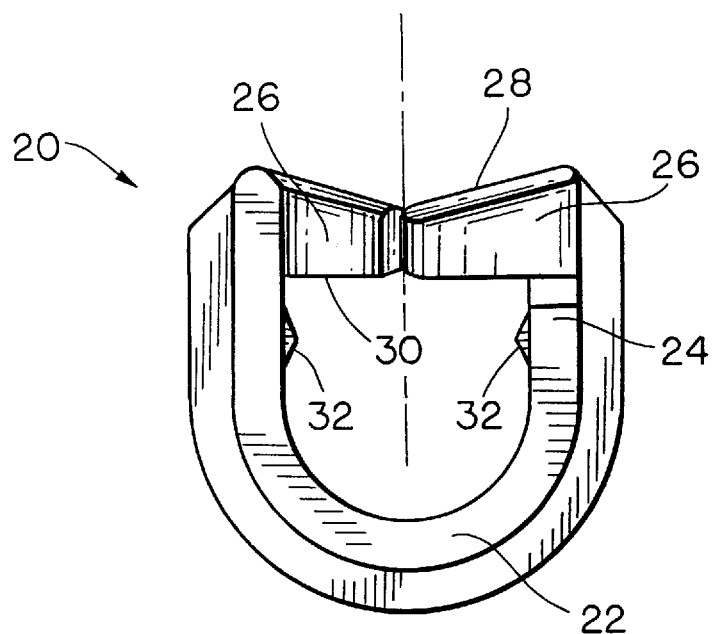
FIG. 4 is an end view of the routing clip shown in FIG. 1.

FIG. 4 is an end view of the routing clip 20 shown in FIG. 1 illustrating further the difference between the upper surface 28 and the lower surface 30 of the inwardly curving projections 26, which, as indicated by the dashed line, extend beyond the centerline of the routing clip 20. The interior of the routing clip 20 also may be seen to include inward projections 32, which are also visible in FIG. 2 and which may help secure a tube in U-shaped channel 22.

Figure 5:
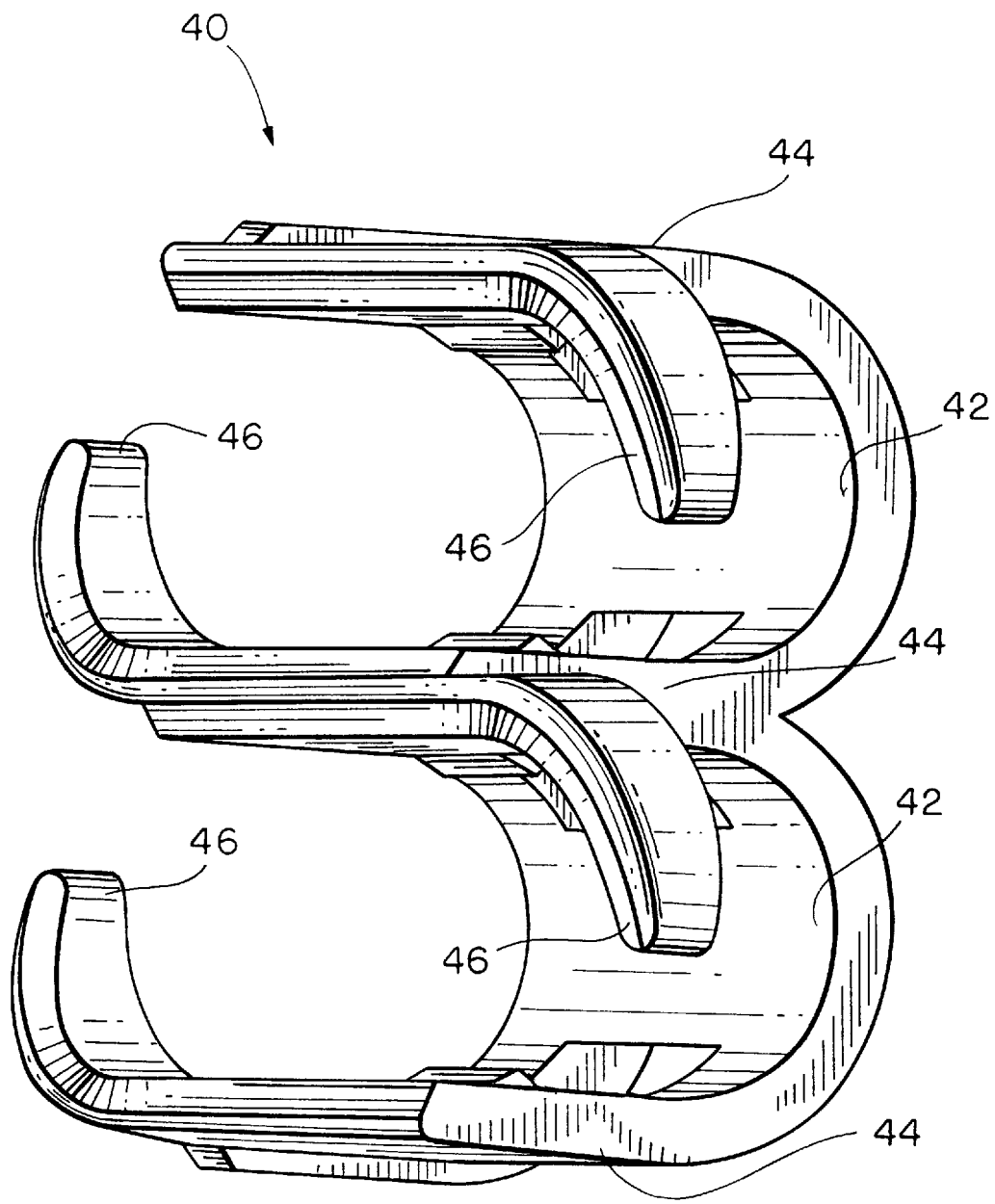
FIG. 5 is a perspective view of a multiple routing clip according to the first embodiment of the present invention.

FIG. 5 is a perspective view of a multiple routing clip 40 in accordance with this first embodiment of the present invention. Multiple routing clip 40 includes two parallel U-shaped channels 42 having three substantially parallel upstanding walls 44, the center one of which is common to the two U-shaped channels 42. At opposite ends of each of the two outer upstanding walls 44 are inwardly curving projections 46. The center upstanding wall 44 has an inwardly curving projection 46 at each end, each curving in the opposite direction toward one of the two outer upstanding walls 44. The extension of the multiple routing clip 40 to include more than two U-shaped channels 42 is a straightforward analogy to the situation shown in FIG. 5. In all other respects, the multiple routing clip 40 shown in FIG. 5 is identical to the single version shown in FIG. 1.

Figure 6:
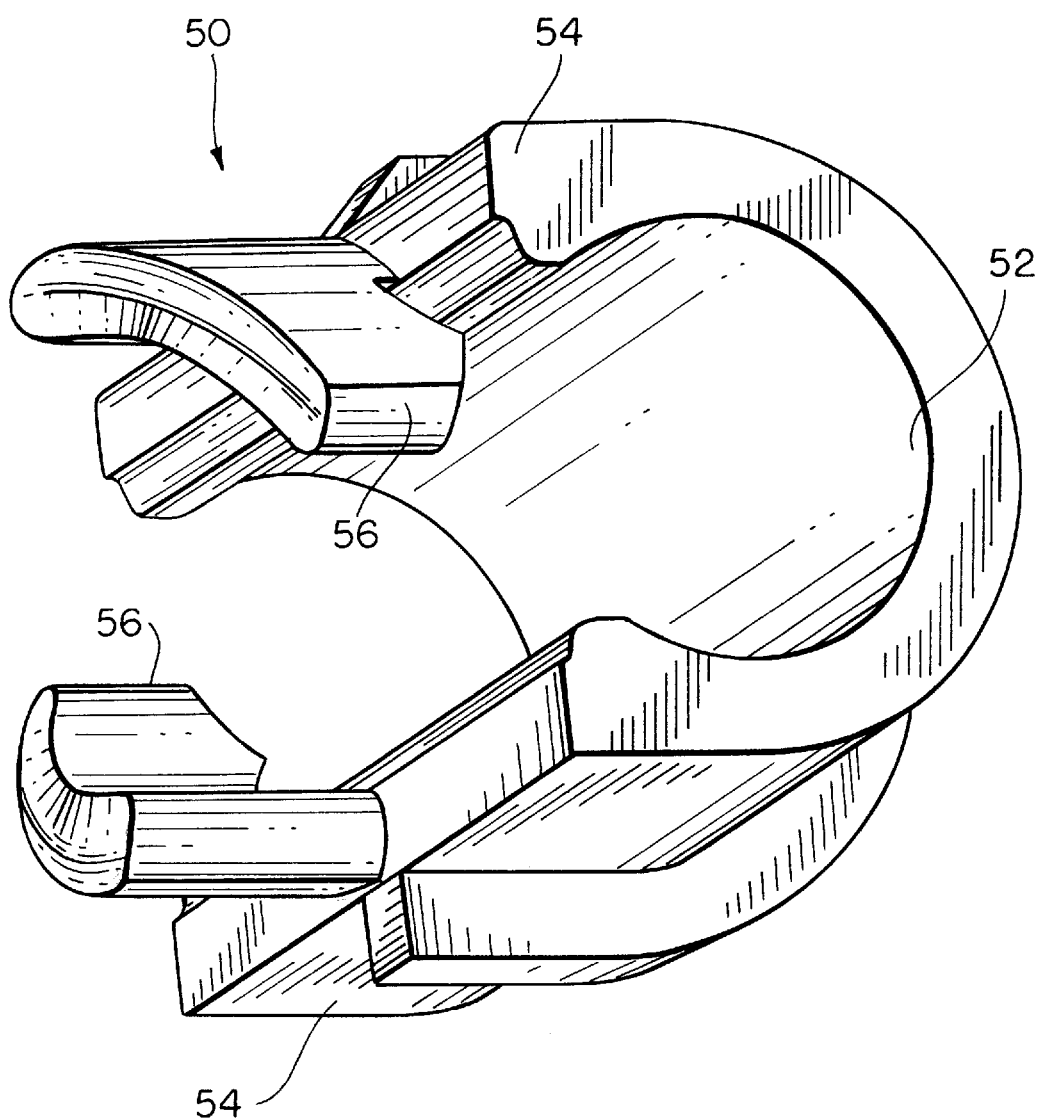
FIG. 6 is a perspective view of a second embodiment of the routing clip of the present invention.

FIG. 6 is a perspective view of a routing clip 50 in accordance with a second embodiment of the present invention. The routing clip 50 is integrally molded from a plastic material, such as mylon 6,6 and comprises a U-shaped channel 52 having two substantially parallel upstanding walls 54. Atop each of the two walls 54 are inwardly curving projections 56, each of which is curved toward an opposite end of the routing clip 50.

Figure 7:
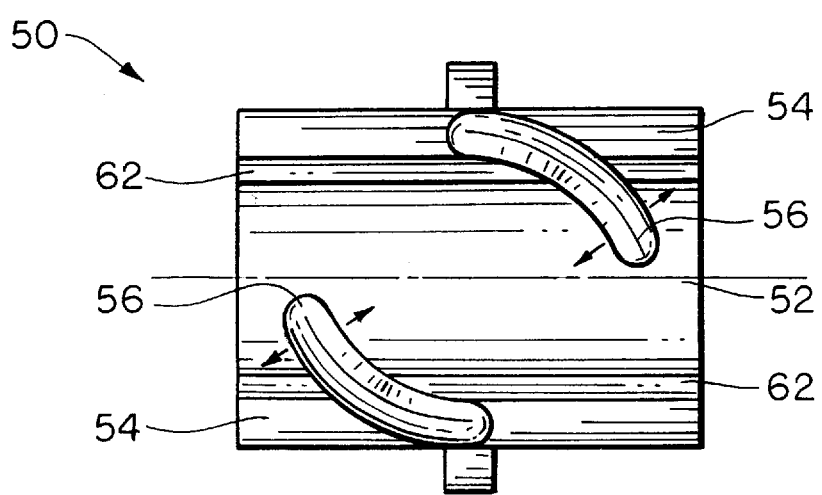
FIG. 7 is a top view of the routing clip shown in FIG. 6.

FIG. 7 is a top view of the routing clip 50 shown in FIG. 6. Inwardly curving projections 56 do not reach the centerline of the routing clip 50 represented by the dashed line in the figure.

Figure 8:
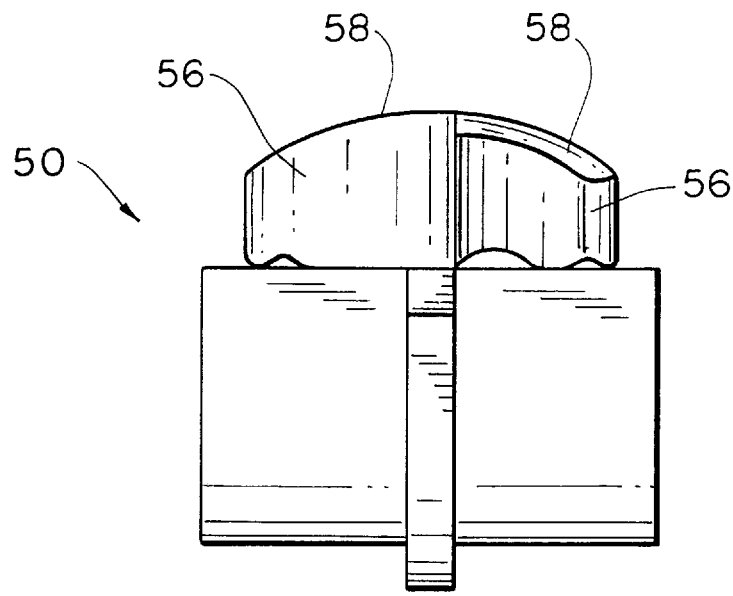
FIG. 8 is a side view of the routing clip shown in FIG. 6.

FIG. 8 is a side view of the routing clip 50 shown in FIG. 6. The inwardly curving projections 56 are thicker in a height direction, as apparent in FIG. 8, then in a width direction, as apparent in FIG. 7. Because of this difference, inwardly curving projections 56 will readily flex in a radial direction, as indicated by the arrows in FIG. 7, but will not readily flex in the vertical direction shown in FIG. 8. As a consequence, inwardly curving projections 56 will flex radially when a tube or the like is inserted into the U-shaped channel 52. The angling of the top surface 58 of the inwardly curving projections 56 facilitates this deflection.

Figure 9:
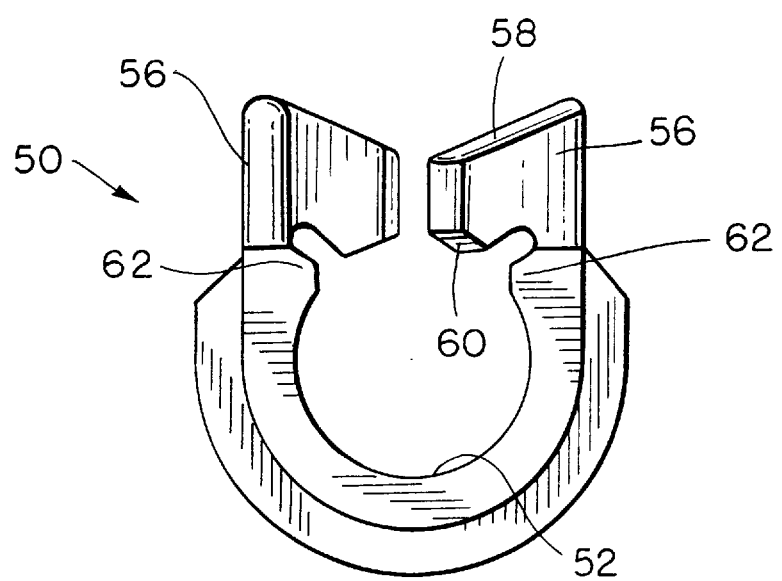
FIG. 9 is an end view of the routing clip shown in FIG. 6.

FIG. 9 is an end view of the routing clip 50 shown in FIG. 6 illustrating the difference between the upper surface 58 and the lower surface 60 of the inwardly curving projections 56, which, as indicated by the dashed line, do not reach the centerline of the routing clip 50. The lower surface 60 has a bevel facing an end of the U-shaped channel which causes a force removing a tube from within U-shaped channel 52 to turn inwardly curving projections 56 in toward the centerline. The interior of the routing clip 50 also may be seen to be rounded and to include projections 62, which are visible in FIG. 7 and which may help secure a tube in U-shaped channel 52.

Figure 10:
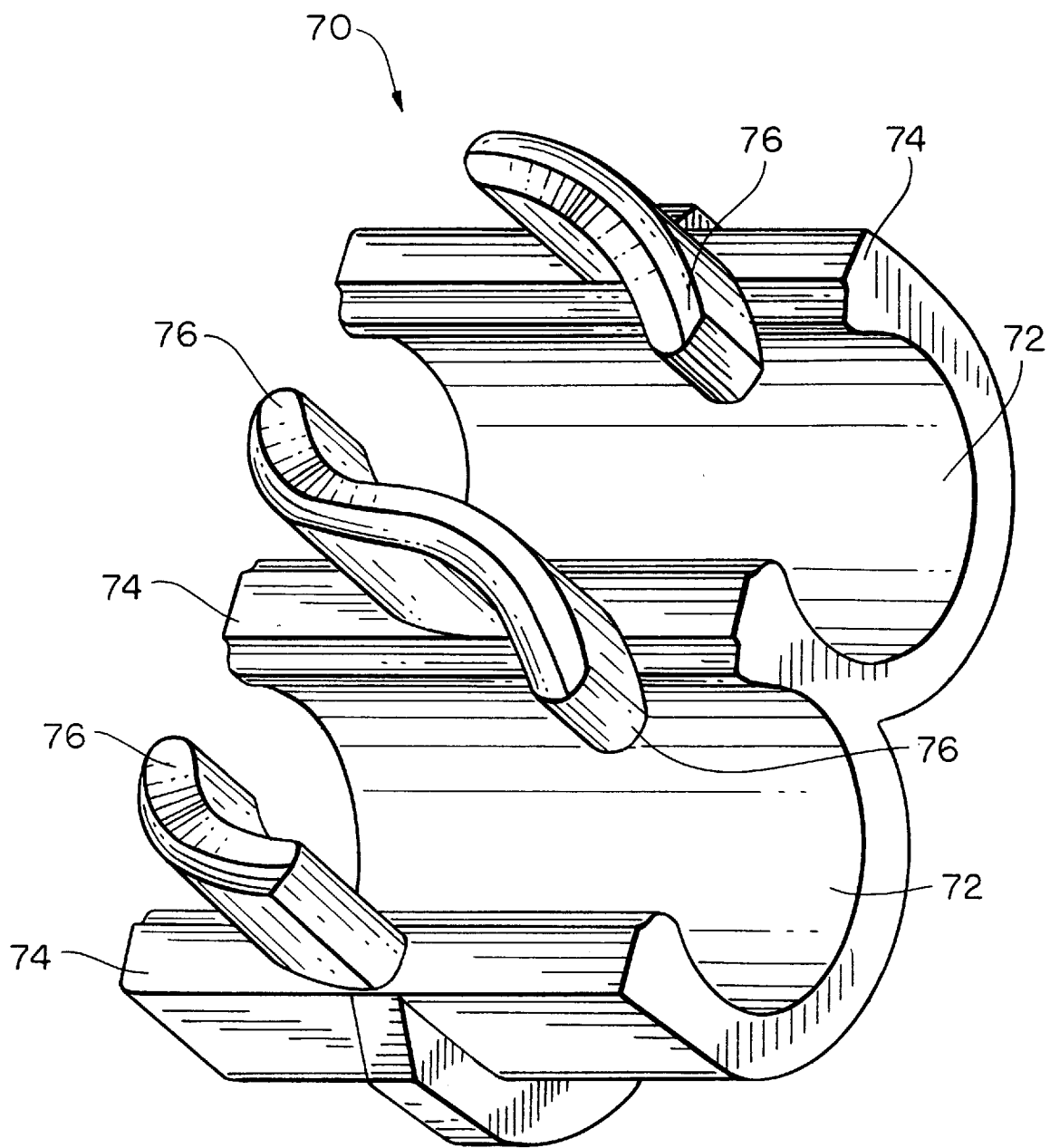
FIG. 10 is a perspective view of a multiple routing clip according to the second embodiment of the present invention.

FIG. 10 is a perspective view of a multiple routing clip 70 in accordance with this second embodiment of the present invention. Multiple routing clip 70 includes two parallel U-shaped channels 72 having three substantially parallel upstanding walls 74, the center one of which is common to the two U-shaped channels 72. Atop each of the two outer upstanding walls 74 are inwardly curving projections 76. The center upstanding wall 74 has an inwardly curving projection 76 directed toward each of the U-shaped channels 72, each curving in the opposite direction toward one of the two outer upstanding walls 74. The extension of the multiple routing clip 70 to include more than two U-shaped channels 72 is a straightforward analogy to the situation shown in FIG. 10. In all other respects, the multiple routing clip 70 shown in FIG. 10 is identical to the single version shown in FIG. 6.

Figure 11:
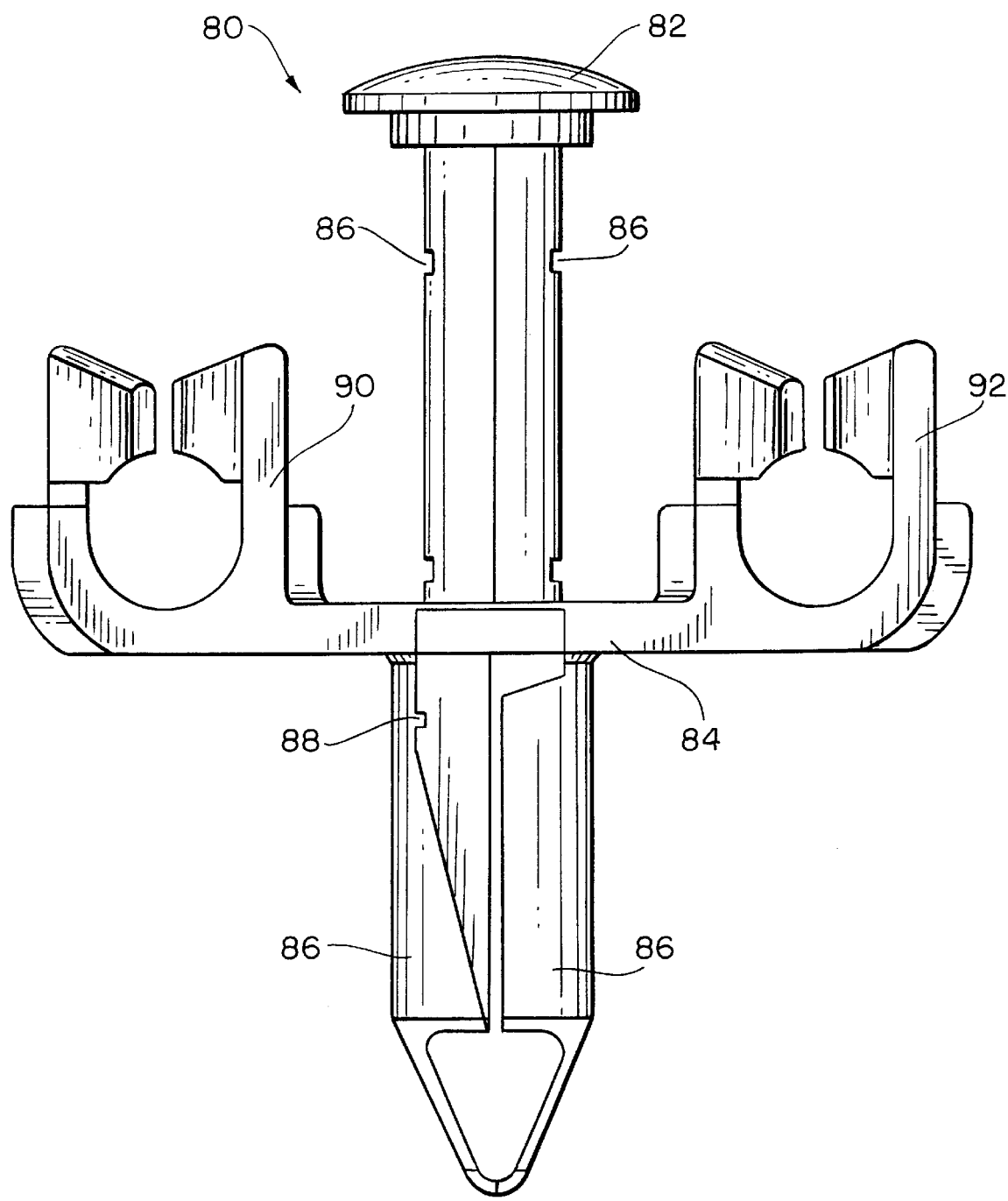
FIG. 11 is an end view of another multiple routing clip according to the second embodiment of the present invention including a means for mounting same to an apertured partition or wall.

FIG. 11 is an end view of another multiple routing clip 80 according to the second embodiment of the present invention. Multiple routing clip 80 includes a means for mounting same to an apertured partition or wall. Those means include a plunger 82 which may be forced downward through a hole in base 84. Spreadable wings 86 are inserted into an aperture in a partition or wall, and plunger 82 is forced downward, which action spreads wings 86 apart. Notches 86 ultimately engage with projections 88, one of which is visible in FIG. 11, within wings 86, and prevent plunger 82 from being withdrawn. A first routing clip 90 and a second routing clip 92, each like that shown in FIG. 6, are provided on base 84 on opposite sides of plunger 82.

Modifications to the above would be obvious to those of ordinary skill in the art, but would not bring the invention so modified beyond the scope of the appended claims.

What is claimed is:

1. A routing clip for fixing a conduit to a support, said routing clip being integrally molded from a plastic material and comprising:

a U-shaped channel for receiving said conduit, said U-shaped channel having a centerline;

two substantially parallel walls extending from said U-shaped channel; and an inwardly curving projection on each of said two substantially parallel walls for securing said conduit in said U-shaped channel, each such projection curving inwardly around an axis substantially perpendicular to said centerline of said U-shaped channel and toward said centerline at opposite ends of said U-shaped channel;

wherein said conduit is insertable into said U-shaped channel in a direction substantially perpendicular to said centerline; and wherein each of said inwardly curving projections is readily flexible in a direction generally perpendicular to its axis but not readily flexible in a direction generally parallel to its axis.

2. A routing clip as claimed in claim 1 wherein said inwardly curving projections are at opposite ends of said two substantially parallel walls.

3. A routing clip as claimed in claim 1 wherein said inwardly curving projections extend beyond the centerline of said U-shaped channel.

4. A routing clip as claimed in claim 1 wherein said substantially parallel walls each have an inward projection above said U-shaped channel.

5. A routing clip as claimed in claim 1 wherein said inwardly curving projections are each atop said two substantially parallel walls.

6. A routing clip as claimed in claim 1 wherein said inwardly curving projections extend to a point before said centerline of said U-shaped channel.

7. A routing clip as claimed in claim 1 wherein said substantially parallel walls have concavely rounded surfaces.

8. A routing clip as claimed in claim 1 wherein said inwardly curving projections have lower sides, said lower sides having a bevel facing an end of said U-shaped channel, so that said inwardly curving projections will be flexed toward said centerline when a tube in said U-shaped channel is pulled outward therefrom.

9. A routing clip as claimed in claim 1 wherein said plastic material is nylon 6,6.

* * * * *